US012304791B2

(12) United States Patent
Buchhauser

(10) Patent No.: US 12,304,791 B2
(45) Date of Patent: *May 20, 2025

(54) DEVICE FOR SUPPLYING A CONTAINER CLOSURE, AND CLOSING DEVICE

(71) Applicant: KRONES AG, Neutraubling (DE)

(72) Inventor: Klaus Buchhauser, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,120

(22) Filed: Apr. 18, 2024

(65) Prior Publication Data

US 2024/0262669 A1 Aug. 8, 2024

Related U.S. Application Data

(63) Continuation of application No. 17/857,814, filed on Jul. 5, 2022, now Pat. No. 11,987,484.

(30) Foreign Application Priority Data

Jul. 6, 2021 (DE) .................... 10 2021 117 469.4

(51) Int. Cl.
*B67B 3/00* (2006.01)
*B67B 3/06* (2006.01)

(52) U.S. Cl.
CPC .................................... *B67B 3/06* (2013.01)

(58) Field of Classification Search
CPC .... B67B 3/00; B67B 3/06; B67B 3/26; B67B 1/04
See application file for complete search history.

(56) References Cited

U.S. PATENT DOCUMENTS 1,350,405 A * 8/1920 Gaynor .................... B67B 3/02 221/277
2,840,970 A * 7/1958 Brown .................... B67B 1/005 53/328

(Continued)

FOREIGN PATENT DOCUMENTS

DE 2734599 2/1979
DE 2849741 5/1980

(Continued)

OTHER PUBLICATIONS

Extended Search Report for European Patent Application No. 22183414.6-1014 dated Nov. 22, 2022; 5 pages.

*Primary Examiner* — Andrew M Tecco
(74) *Attorney, Agent, or Firm* — Haynes and Boone, LLP

(57) ABSTRACT

A device for supplying a container closure to a closing device for closing a container with a container closure, includes a rotatable carrier wheel for transporting a container closure from a supply position, at which the container closure to be supplied is supplied from a closure supply, to a transfer position, at which the transported container closure is received by a closing device, wherein the carrier wheel is configured so as to be displaceable between an operating position corresponding to the transfer position, and a retracted position in which the carrier wheel is spaced from the transfer position. The device also includes a scraping unit configured to remove the container closure held by the closing device. The scraping unit is mounted upstream of the rotatable carrier wheel with respect to a movement direction of the closing device. A closing device including the device is also described.

20 Claims, 8 Drawing Sheets

(56) References Cited

U.S. PATENT DOCUMENTS

| | | | | | |
|---|---|---|---|---|---|
| 3,803,800 | A * | 4/1974 | Tavernier | B67B 1/005 53/306 |
| 4,277,928 | A * | 7/1981 | Ahlers | B67B 3/26 53/64 |
| 5,285,618 | A * | 2/1994 | Bernhard | B67B 3/062 53/308 |
| 6,829,875 | B2 * | 12/2004 | Willstumpf | B67B 1/04 53/321 |
| 7,503,154 | B2 * | 3/2009 | Monti | B67B 1/005 53/308 |
| 8,647,101 | B2 * | 2/2014 | Quetel | B67C 7/0046 425/150 |
| 11,987,484 | B2 * | 5/2024 | Buchhauser | B67B 3/06 |
| 2011/0250307 | A1 * | 10/2011 | Quetel | B67C 3/22 425/150 |

FOREIGN PATENT DOCUMENTS

| | | | |
|---|---|---|---|
| DE | 3843374 | A1 | 7/1990 |
| DE | 4129452 | A1 | 1/1993 |
| EP | 0541077 | A1 | 5/1993 |

* cited by examiner

DEVICE FOR SUPPLYING A CONTAINER CLOSURE, AND CLOSING DEVICE

CROSS-REFERENCE TO RELATED APPLICATIONS

This application is a continuation of U.S. application Ser. No. 17/857,814 filed on Jul. 5, 2022 and entitled “DEVICE FOR SUPPLYING A CONTAINER CLOSURE, AND CLOSING DEVICE,” which claims priority from German Patent Application No. DE 10 2021 117 469.4, filed on Jul. 6, 2021 in the German Patent and Trademark Office, the disclosures of which are incorporated herein by reference in their entirety.

BACKGROUND

Technical Field

The present invention concerns a device for supplying a container closure, for example a crown cap, to a closing device for closing a container with a container closure, and a closing device for container closures.

Related Art

For supplying a container closure, for example a crown cap, to a closing device for closing a container with the supplied container closure, it is known to drag the container closure from a hand-over plate to a closing unit of the closing device, for example by means of a receiving element e.g. in the form of a lug. This lug cannot however be used with certain filler types, or only with a high fault probability. For example, in a chamber filler, collisions may occur with the respective chambers containing the filled containers, or with their seals.

Alternatively, for this it is known to supply container closures individually to the closing device or its closing unit via a device with a carrier wheel. Such supply devices are known for example from DE 28 49 741 A1, DE 27 34 599 A1, or EP 0 541 077 A1. Such devices may however be difficult to access and complicated to clean.

With the aim of improving a possibility of cleaning individual closing apparatus of the closing device and the supply device, it is furthermore known from DE 38 43 374 A1 to form a combination of carrier wheel and part of a closure supply in the form of a transport channel so as to be height-adjustable in the direction of the rotational axis of the carrier wheel.

SUMMARY

An improved device for supplying a container closure, for example a crown cap, to a closing device for closing a container with a container closure, and an improved closing device for container closures is described herein according to various embodiments.

Accordingly, a device is proposed for supplying a container closure, for example a crown cap, to a closing device for closing a container with a container closure, comprising a rotatable carrier wheel for transporting a container closure from a supply position, at which the container closure to be supplied is supplied from a closure supply, to a transfer position, at which the transported container closure is received by a closing device. Furthermore, in a device, the carrier wheel is configured so as to be displaceable between an operating position corresponding to the transfer position, and a retracted position in which the carrier wheel is spaced from the transfer position.

Because the carrier wheel is configured so as to be displaceable between an operating position corresponding to the transfer position, and a retracted position in which the carrier wheel is spaced from the transfer position, in comparison with conventional devices, an improved accessibility to the carrier wheel and closing device can be provided, in particular to a carousel of the closing device on which, in some embodiments, a plurality of closing units and container receivers are arranged. Accordingly, installation, maintenance and/or cleaning of the device and/or the closing device may be facilitated or simplified.

Also, the device may be used for a plurality of closing devices even if these have treatment pitch circles of different sizes, on which the containers to be closed are transported. Individual adaptation to the respective pitch circle may be achieved by adjusting the operating position, and hence accordingly the transfer position and the retracted position. Accordingly, the supply and delivery of the container closures can take place particularly precisely.

Furthermore, with a device according to one embodiment of the invention, the safety of a closing device or a filling system, for filling containers with a filling product and closing the containers with a container closure, during operation can be increased. In particular, a collision of the container closure supply, such as the carrier wheel, with a closing unit can be prevented by a sudden retraction into the retracted position.

During operation of a closing device, it may occur for example that the guidance of a closing unit, such as a guide roller, via which the vertical position of the closing unit is predefined, suffers a fault. As a result, the closing unit may fall down or be moved down under gravity and/or because of a preload force, such that its closing die would collide with the device for supplying container closures, e.g. the carrier wheel, and massive damage could occur to the supply device and/or the closing device. Because of the above-mentioned displaceable design of the carrier wheel, this can be retracted spontaneously out of the transfer position in the case of a fault in the guidance of a closing unit, so as to prevent a collision between the carrier wheel and the closing unit. In certain embodiments, such a retraction occurs in reaction to a fault detected by means of a sensor or detector, such as a broken roller. The carrier wheel may then be retracted from the collision region for example within fractions of a second.

The retracted position is oriented relative to the transfer position such that, when the device is arranged on a closing device, the carrier wheel is further removed from the closing device, relative to the closing device, than in the operating position corresponding to the transfer position, wherein the removal or displacement in particular comprises a horizontal component or extends fully horizontally. For example, a distance present between a rotational axis of the carrier wheel and a rotational axis of a carousel of the closing device can be increased by moving the carrier wheel out of the operating position into the retracted position. The term “retract” or “withdraw” may accordingly be understood as increasing the distance of the closing device relative to the rotational axis of the carousel, for example in a direction perpendicular to the rotational axis of the carousel.

According to one embodiment, the carrier wheel is rotatable about a rotational axis which is in some embodiments oriented substantially vertically.

It has been found to be particularly advantageous if a displacement direction of the carrier wheel between the operating position and the retracted position is oriented substantially horizontally.

In another embodiment, the displacement direction may accordingly be oriented perpendicularly to the rotational axis of the carrier wheel.

Alternatively or additionally, the displacement direction, viewed in a plane perpendicular to the rotational axis, may be oriented in a region of ±90° to a straight line which extends through the transfer position in the radial direction relative to the rotational axis, wherein the displacement direction is in several embodiments oriented in the direction of the straight line which extends through the transfer position in the radial direction relative to the rotational axis. In this way, it can ensure that on a displacement of the carrier wheel from the transfer position, a distance between the rotational axis of the carrier wheel and the closing device, in particular a central rotational axis of the closing device, increases.

According to a further embodiment, a scraping unit is mounted upstream of the carrier wheel with respect to a movement direction of the closing device, by means of which any container closure held in a closing unit of the closing device and not applied to a container in a temporally preceding closing process, and therefore remaining undesirably in the closing unit, can be removed from the closing unit, so that the closing unit in the transfer position can collect a new container closure from the carrier wheel.

In certain embodiments, the scraping unit comprises a scraper plate and a removal element, for example a protrusion or a magnet element, for removing a container closure held by the closing device. The scraper plate is in various embodiments at least partially oriented so as to provide a scraping via a scraping sheet of the closing device which is movable in the movement direction of the closing device. It has proved advantageous if the scraper plate is oriented at least partially substantially horizontally.

The term "scraping" here means a movement of the scraping sheet over the scraper plate, with a distance between the scraper plate and scraping sheet which is smaller than the height of the container closure transported by the device.

It has proved advantageous if the scraper plate, at least in a scraping portion, follows the movement track of the closing units of the closing device. In some embodiments, the removal element, viewed in the movement direction of the closing units, is arranged in the starting region of the scraping portion. For example, a magnet element may be arranged below the scraper plate. The magnet element can, by magnetic attraction, draw a container closure held in the closing unit, for example a crown cap, from the closing unit onto the scraper plate. By means of the scraping sheet, the container closure can then be pushed or scraped from the region of the magnet element, for example to a closure collecting unit for collecting the ejected container closures.

According to a further embodiment, the scraping unit is configured so as to be displaceable between an operating position, in which scraping via the scraping sheet of the closing device is possible, and a retracted position. In certain embodiments, a displacement direction of the scraping unit is here formed parallel to the displacement direction of the carrier wheel, wherein in some embodiments the carrier wheel and the scraping unit are configured so as to be displaceable jointly, for example by means of a common drive and/or a common base frame. Alternatively, the carrier wheel and the scraping unit may also be configured so as to be displaceable independently of one another, wherein the carrier wheel and the scraping unit in various embodiments each have their own assigned drive.

In one or more embodiments, a drive is provided for displacing the carrier wheel from the operating position into the retracted position, which drive is configured for displacement at high speed, for example in the form of a locked and preloaded spring pack and/or a locked and pressurised pneumatic cylinder, which is unlocked by a controller/regulator on occurrence of a collision warning in order to achieve a sudden displacement.

In some embodiments, a drive is provided for displacing the scraping unit from the operating position into the retracted position, which drive is configured for displacement at high speed, for example in the form of a locked and preloaded spring pack and/or a locked and pressurised pneumatic cylinder, which is unlocked by a controller/regulator on occurrence of a collision warning in order to achieve a sudden displacement.

According to a further embodiment, a closure supply is provided for successive radial supply of container closures to the carrier wheel. In various embodiments, the closure supply comprises a supply chute via which container closures may be supplied individually to the carrier wheel, wherein the supply chute is for example configured such that the container closures are moved in the direction of the carrier wheel at least supported by the force of gravity.

The closure supply may in some embodiments be arranged at the sides of the transfer position, viewed in a plane perpendicular to the rotational axis of the carrier wheel, in a region of ±90° to the displacement direction. Then the closure supply may be arranged stationarily, wherein on displacement of the carrier wheel from the operating position, and hence retraction of the carrier wheel, no collision occurs between the carrier wheel and the closure supply.

Alternatively or additionally, the closure supply may be configured so as to be movable between a supply position, corresponding to the transfer point, and an offset position, wherein by movement of the closure supply into the offset position, the closure supply can be brought outside a collision space of the carrier wheel. For example, the closure supply may be moved into its offset position before the carrier wheel is displaced out of the operating position. Alternatively, both the above-mentioned movements may take place simultaneously.

The term "collision space" means the spatial region which is used or traversed by the carrier wheel as a whole on movements between the operating position and the retracted position.

According to a further embodiment, a plurality of closure supplies is provided, wherein in various embodiments each closure supply is configured to supply one type from various types of container closures, wherein in several embodiments at least one closure supply is arranged on each opposite side of the carrier wheel with respect to an axis extending through the transfer position in the direction of the displacement direction of the carrier wheel. In one or more embodiments at least two, for example precisely two container supplies are provided, wherein these are for example arranged on opposite sides of the carrier wheel with respect to the axis extending through the transfer position in the direction of the displacement direction of the carrier wheel.

According to a further embodiment, a controller/regulator is provided which is configured for controlling/regulating the position of the carrier wheel, the scraping unit and/or the at least one closure supply, wherein the controller/regulator is for example configured, on a collision warning, to move the carrier wheel and/or the scraping unit into the respective retracted position, and in some embodiments move the at least one closure supply out of the collision space, for example in each case with a high speed of the respective movement or displacement. In particular, this allows a reaction to any fault in a guidance of a closing unit of the closing device, such as breakage of a guide roller, and thus a collision may be prevented between the closing unit, which has slipped downwards because of the fault, i.e. in the direction of gravity, and the carrier wheel and/or scraping unit.

The retraction at high speed, for example quasi-abruptly, may be achieved by provision of a corresponding energy store. Here for example, a preloaded spring pack or a pressurised pneumatic cylinder may be provided, the energy of which is released by unlocking of a lock and thus accordingly a sudden retraction achieved.

According to a further embodiment, a closure collecting unit, for example comprising a hopper-shaped inlet and/or a collecting trough or a collecting basket, is arranged at least partially below the scraping unit and/or below the carrier wheel.

In one or more embodiments, the closure collecting unit is configured to collect container closures scraped off by the scraping unit, for example at least when the scraping unit is in the operating position.

Alternatively or additionally, the closure collecting unit is in various embodiments configured to collect container closures discharged from the carrier wheel, for example at least when the carrier wheel is in the retracted position.

Alternatively or additionally, the closure collecting unit is in one or more embodiments configured to collect container closures discharged from the closure supply, for example at least when the carrier wheel is in the retracted position.

A closing device for container closures according to various embodiments is also described herein.

Accordingly, a closing device for container closures is proposed, comprising a container receiver which is movable in a movement direction for receiving a container to be closed, and a closing unit assigned to the container receiver and movable relative to the container receiver, for closing the container held in the container receiver with a container closure. The closing device for container closures furthermore comprises a device for supplying a container closure according to one of the above embodiments.

Because the closing device for container closures comprises a device for supplying a container closure according to one of the above-mentioned embodiments, or such a device is provided on the closing device, the advantages and effects described with respect to the device are achieved similarly by the closing device, and vice versa.

According to one embodiment, the closing device is configured as a carousel, wherein for example a rotatable carousel comprises, for example on its outer circumference, the container receiver and the closing unit.

In certain embodiments, the carrier wheel and the carousel are arranged such that a transport pitch circle of the carrier wheel, on which a container closure to be supplied is transported by the carrier wheel, and a conveying pitch circle of the carousel, on which the closing unit is moved by rotation of the carousel, are arranged tangentially to one another and/or meet in the transfer position.

BRIEF DESCRIPTION OF THE FIGURES

Further embodiments of the invention are explained in more detail below with reference to the following description of the figures.

DETAILED DESCRIPTION

Exemplary embodiments are described below with reference to the figures. The same or similar elements, or those with similar function, carry the same reference signs in the different figures, and repeated description of these elements is partially omitted so as to avoid redundancies.

Figure 1:
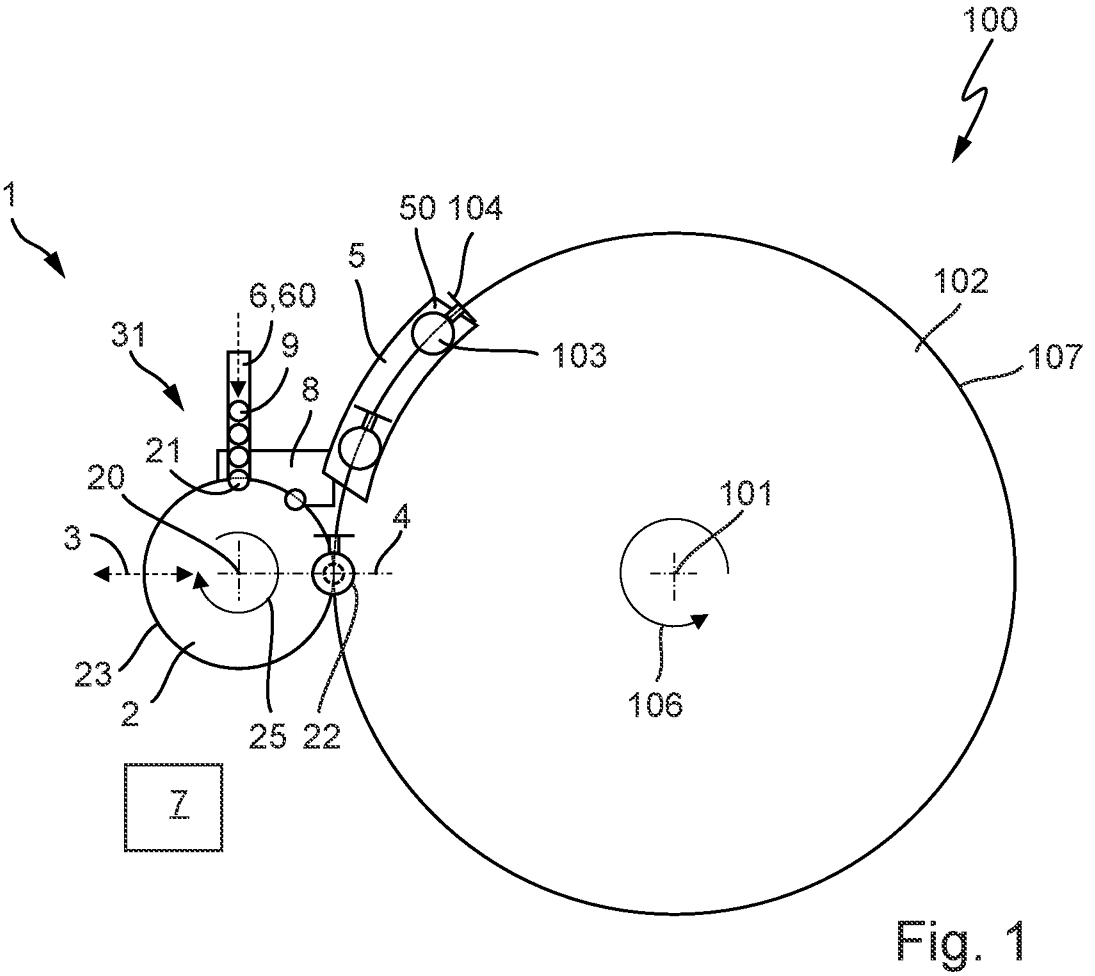
FIG. 1 shows schematically, a top view of a closing device for container closures with a device for supplying a container closure to the closing device.

FIG. 1 shows schematically a top view of a closing device 100 for container closures 9 with a device 1 for supplying a container closure 9 to the closing device 100. The closing device 100 in the present case is configured to close containers in the form of glass bottles (not shown) with a crown cap. Accordingly, the device 1 is configured for supplying crown caps to the closing device 100. Alternatively, the closing device 100 and accordingly the device 1 may also be configured for processing other container closures, for example screw caps or roll-on caps.

The closing device 100 is configured as a carousel. It comprises a carousel 102 which is rotatable about a central rotational axis 101, and on the periphery of which a plurality of closing units 103 are moved in the movement direction 106 on a conveying pitch circle 107, wherein said closing units are movable parallel to the rotational axis 101 for closing a container (not shown), held in a container receiver (not shown) assigned to the respective closing unit 103, with a container closure 9.

The device 1 comprises a carrier wheel 2 which is rotatable about a horizontally oriented rotational axis 20, and by means of which a container closure 9 is transported from a supply position 21, at which the container closure 9 to be supplied is supplied by a closure supply 6, along a transport pitch circle 23, to a transfer position 22, at which the transported container closure 9 is received by a closing unit 103 of the closing device 100.

The carrier wheel 2 is configured so as to be displaceable in a predefined displacement direction 3 between an operating position 31, corresponding to the transfer position 22 and corresponding to the position of the carrier wheel 2 in FIG. 1, and a retracted position (not shown here). In the retracted position, the carrier wheel 2 is spaced from the transfer position 22.

In the operating position 31, the carrier wheel 2 is arranged relative to the carousel 102 such that the transport pitch circle 23 of the carrier wheel 2 and the conveying pitch circle 107 of the carousel 102 are arranged tangentially to one another, i.e. they touch in the transfer position 22.

In the present case, the displacement direction 3 of the carrier wheel 2 is optionally oriented substantially horizontally. In other words, the displacement direction 3 is oriented substantially perpendicularly to the direction of gravity, which corresponds to the direction of the top view in FIG. 1. Accordingly, the displacement direction 3 is also oriented perpendicularly to the rotational axis 20 of the carrier wheel 2. The displacement direction 3 extends, viewed in a plane perpendicular to the rotational axis 20 and corresponding to the illustration in FIG. 1, in the direction of a straight line 4 which extends through the transfer position 22 in the radial direction relative to the rotational axis 20. Because of the above-described tangential arrangement of the transport pitch circle 23 and conveying pitch circle 107, the displacement direction 3 also corresponds to a radial direction of the central rotational axis 101 of the carousel 102.

The closure supply 6 is configured for successive radial supply of container closures 9 to the carrier wheel 2. It is arranged perpendicularly to the displacement direction 3, viewed in the plane perpendicular to the rotational axis 20 of the carrier wheel 2. The closure supply 6 in this case comprises a supply chute 60, by means of which individual container closures 9 are supplied to the carrier wheel 2 under force of gravity.

Alternatively, the closure supply 6 may also be arranged in a region of ±90° to the displacement direction 3 at the sides of the transfer position 22, and/or be configured so as to be movable between the supply position 21 and an offset position, wherein then, by moving the closure supply 6 to the offset position, the closure supply 6 can be brought outside a collision space of the carrier wheel 2.

The device 1 furthermore comprises a scraping unit 5 which is mounted upstream of the carrier wheel 2 relative to the movement direction 106 of the closing device 100, and accordingly also relative to the transport direction 25. By means of the scraping unit 5, it is possible to remove a container closure 9 held in one of the closing units 103, out of the closing unit 103, before this closing unit 103 receives a newly supplied container closure 9 from the carrier wheel 2 at the transfer point 22.

To this end, the scraping unit 5 comprises a scraper plate 50 which extends along the conveying pitch circle 107 in a portion of the conveying pitch circle 107. Below the scraper plate 50, the scraping unit 5 comprises a removal element in the form of a magnet element 51, for removing the container closure 9 held in the closing unit 103. Because of the magnetic attraction of the magnet element 51 on the container closure 9 in the form of the crown cap, the latter is drawn from the closing unit 103 onto the scraper plate 50.

Each closing unit 103 comprises a scraping sheet 104 which scrapes over the scraper plate 50 during movement of the respective closing unit 103 in the movement direction 106. This "scraping" corresponds to a movement of the scraping sheet 104 over the scraper plate 50 with a distance between the scraper plate 50 and scraping sheet 104 which is smaller than the height of the container closures 9. Accordingly, the scraping sheet 104 conveys or pushes the container closure 9, removed from the closing unit 103, in the movement direction 106 over the scraper plate 50 up to a closure collecting unit 8, which is configured for collecting container closures 9 removed from closing units 103 by means of the scraping unit 9 and which extends partially below the scraping unit 5 and below the closure supply 6.

Like the carrier wheel 2, the scraping unit 5 is configured so as to be displaceable between an operating position 31, in which scraping via the scraping sheets 104 of the closing device 100 is possible, and a retracted position. The operating position 31 corresponds to the position of the scraping unit 5 shown in FIG. 1.

The scraping unit 5 is also configured so as to be displaceable in the displacement direction 3. In the present case, the scraping unit 5 is configured to be moved together with the carrier wheel 2. Alternatively, the scraping unit 5 may also be configured to be displaceable independently of the carrier wheel 2. Furthermore, the displacement direction of the scraping unit 5 may also be oriented differently from the displacement direction 3 of the carrier wheel 2. For example, the displacement direction of the scraping unit 5 may be oriented in the radial direction relative to the rotational axis 101 of the closing device 100.

The device 1 furthermore comprises a controller/regulator for controlling/regulating the position of the carrier wheel 2 and/or the scraping unit 5, wherein the controller/regulator 7 in the present case is configured to move the carrier wheel 2 and scraping unit 5 into the retracted position 31 at high speed on occurrence of a collision warning.

The retraction at high speed, for example quasi-abruptly, can be achieved by the provision of a corresponding energy store. Here for example, a preloaded spring pack or a pressurised pneumatic cylinder may be provided, the energy of which is released by unlocking of a lock, and accordingly a sudden retraction achieved.

Figure 2:
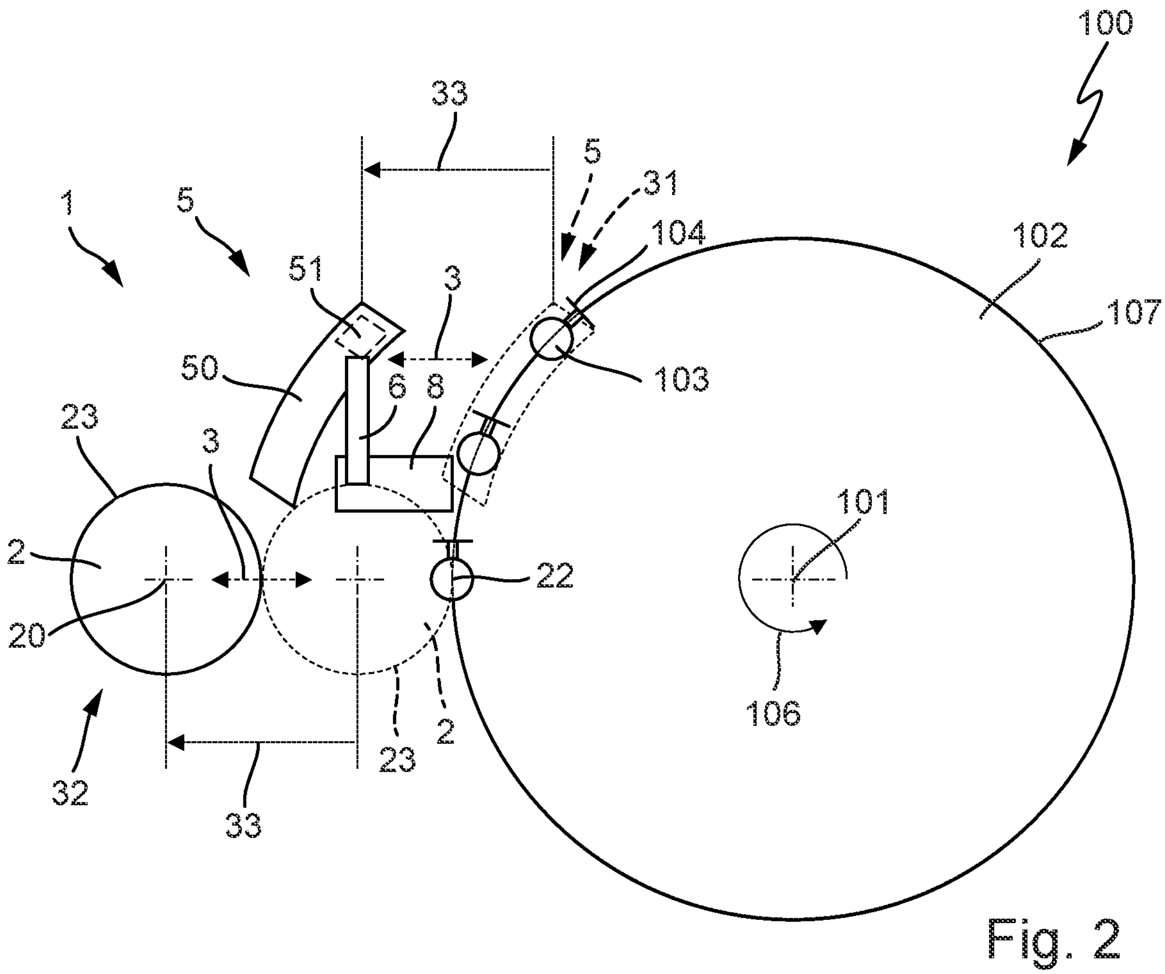
FIG. 2 shows schematically, a further top view of the closing device from FIG. 1.

FIG. 2 shows schematically a further top view of the closing device 100 from FIG. 1. In this illustration, the carrier wheel 2 and the scraping unit 5 have been moved out of the operating position 31, shown in dotted lines, in the displacement direction 3 over a predefined distance 33 into the retracted position 32. Accordingly, the carrier wheel 2 and the scraping unit 5 are spaced from the carousel 102, in particular the conveying pitch circle 107.

By the displacement of the carrier wheel 2, container closures 9 present in the closure supply 6 can be flung into the closure collecting unit 8, for example if another type of container closure is to be used.

Figure 3:
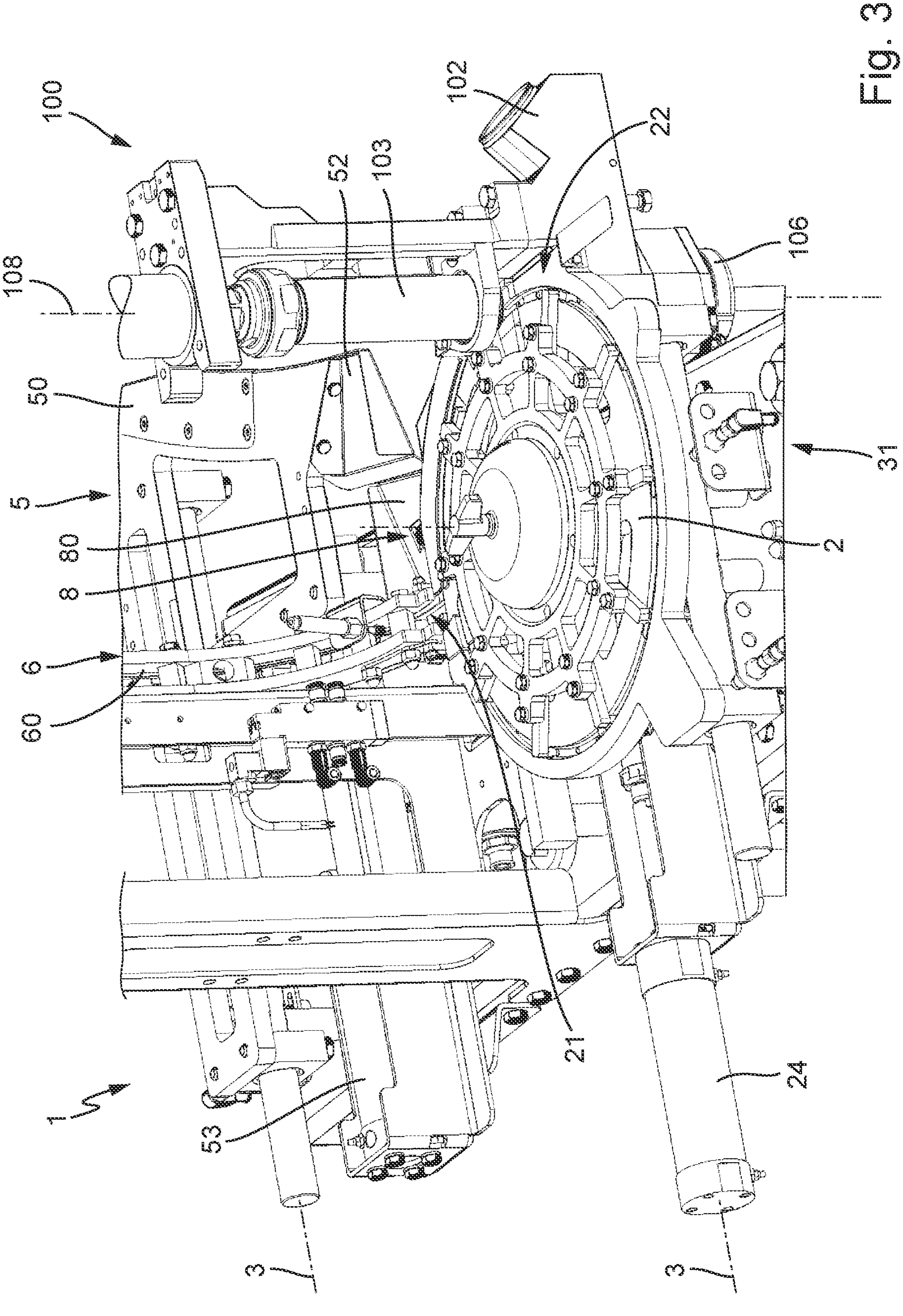
FIG. 3 shows schematically, a perspective side view of a part region of a closing device for container closures with a device for supplying a container closure to the closing device, according to a further embodiment.
Figure 4:
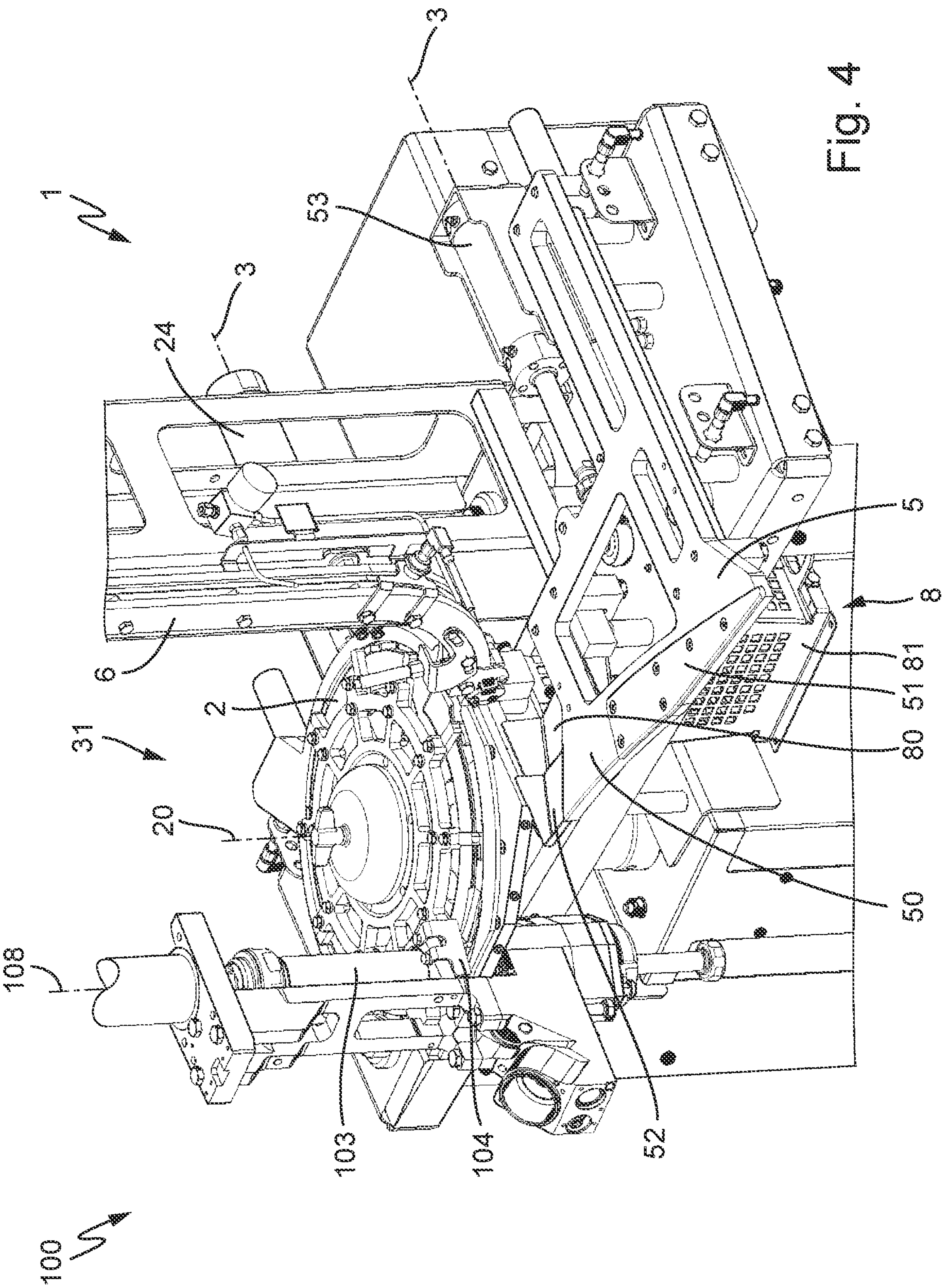
FIG. 4 shows schematically, a further perspective side view of the closing device from FIG. 3.

FIGS. 3 and 4 show schematically a perspective side view of a part region of a closing device 100 for container closures 9 with a device 1 for supplying a container closure to the closing device 100 according to a further embodiment.

The closing device 100 and the device 1 substantially correspond in their structure and function to the embodiment in FIGS. 1 and 2.

In FIG. 3 and FIG. 4, the carrier wheel 2 and the scraping unit 5 are shown in the operating position 31. To move the carrier wheel 2 in the displacement direction 3, this comprises a drive 24 which can be controlled/regulated by the controller regulator 7 (see FIG. 1), in the present case in the form of a pneumatic cylinder or hydraulic cylinder.

Furthermore, the scraping unit 5 comprises a drive 53, by means of which the scraping unit 5 can be moved in the displacement direction 3 by the controller/regulator 7. The scraping unit 5 may also be retracted again by means of its drive 53, in the same way as the carrier wheel 5, in order here again to avoid a collision of a closing unit with the scraping unit 5.

In an exemplary embodiment, the drive 24 takes the form of a pneumatic cylinder preloaded with compressed air, which stores the energy for the sudden retraction of the carrier wheel 2. The stored energy can be accessed by unlocking a corresponding lock which is released by the controller/regulator 7 on occurrence of a collision warning.

In order to supply the closure collecting unit 8 with the container closures 9 removed by the scraping unit 5 from the closing units 103, the scraping unit 5 has a deflector plate 52, by means of which the scraping sheet 104 supplies container closures 9, scraped from the scraper plate 50, to an inlet 80 of the closure collecting unit 8 under force of gravity. From the inlet 80, the container closures 9 enter a collecting trough 81 of the closure collecting unit 8, again under force of gravity.

Reference sign 108 indicates the longitudinal direction of the closing units 103, which also corresponds to the movement direction of the closing units 103.

Figure 5:
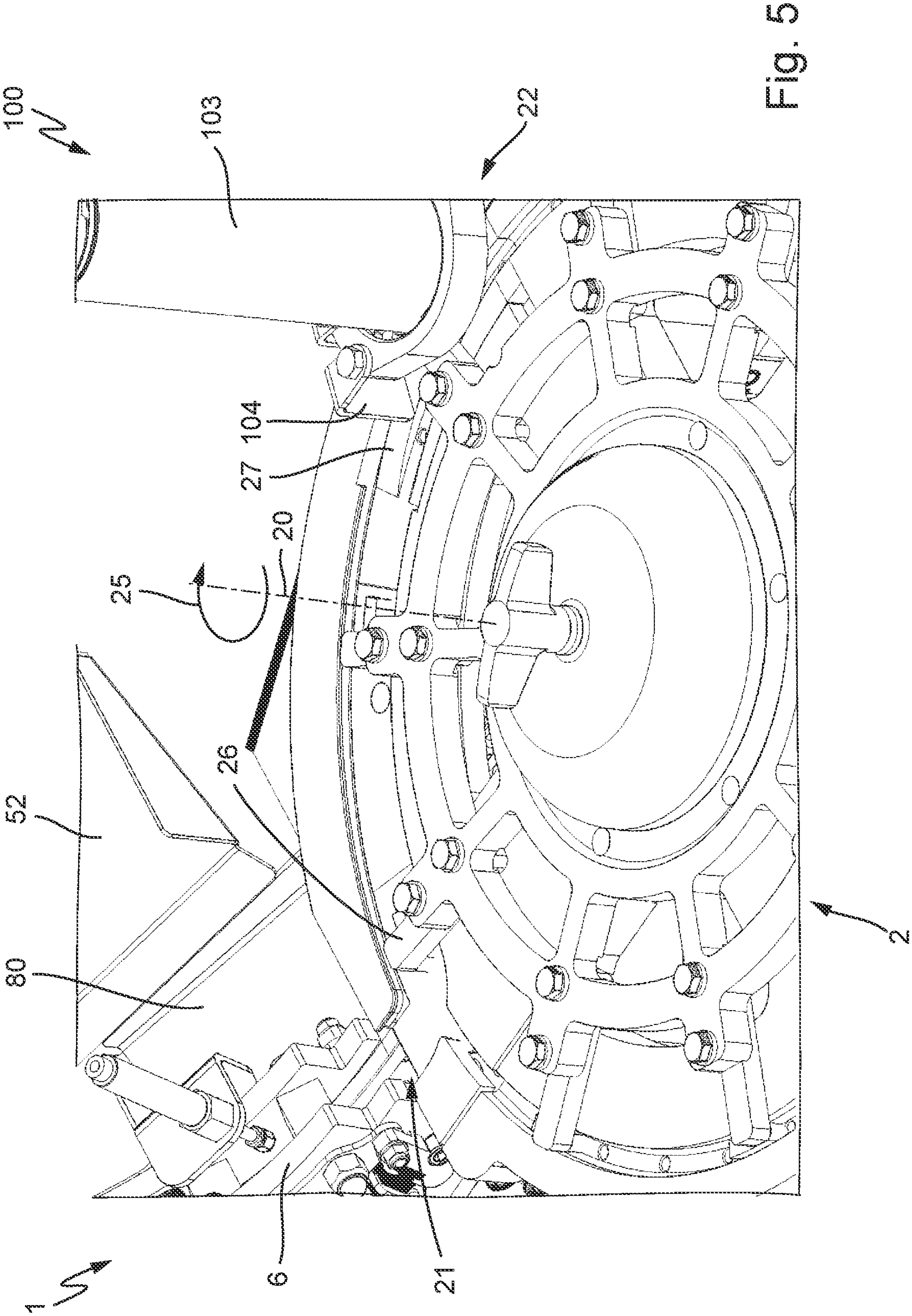
FIG. 5 shows schematically, a perspective detail view of a part region of the device from FIG. 3.

FIG. 5 shows a perspective detail view of a part region of the device 1 from FIG. 3, showing the supply position 21 and the transfer position 22. The carrier wheel 2 comprises a plurality of carriers 26, by means of which a respective container closure is moved from the supply position 21 to the transfer position 22. The carrier wheel 2 comprises, directly upstream of the transfer position 22, a ramp 27 by means of which the container closures 9 are raised in the direction of the closing unit 103 so that the closing unit 103 can collect the container closure 9. Alternatively or additionally, the closing unit 103 may also be lowered to the carrier wheel 2 in order to collect the container closure 9, or support a collection of the container closure. The closing unit 103 may comprise a magnet unit (not shown) for collecting and/or holding the container closure 9.

Figure 6:
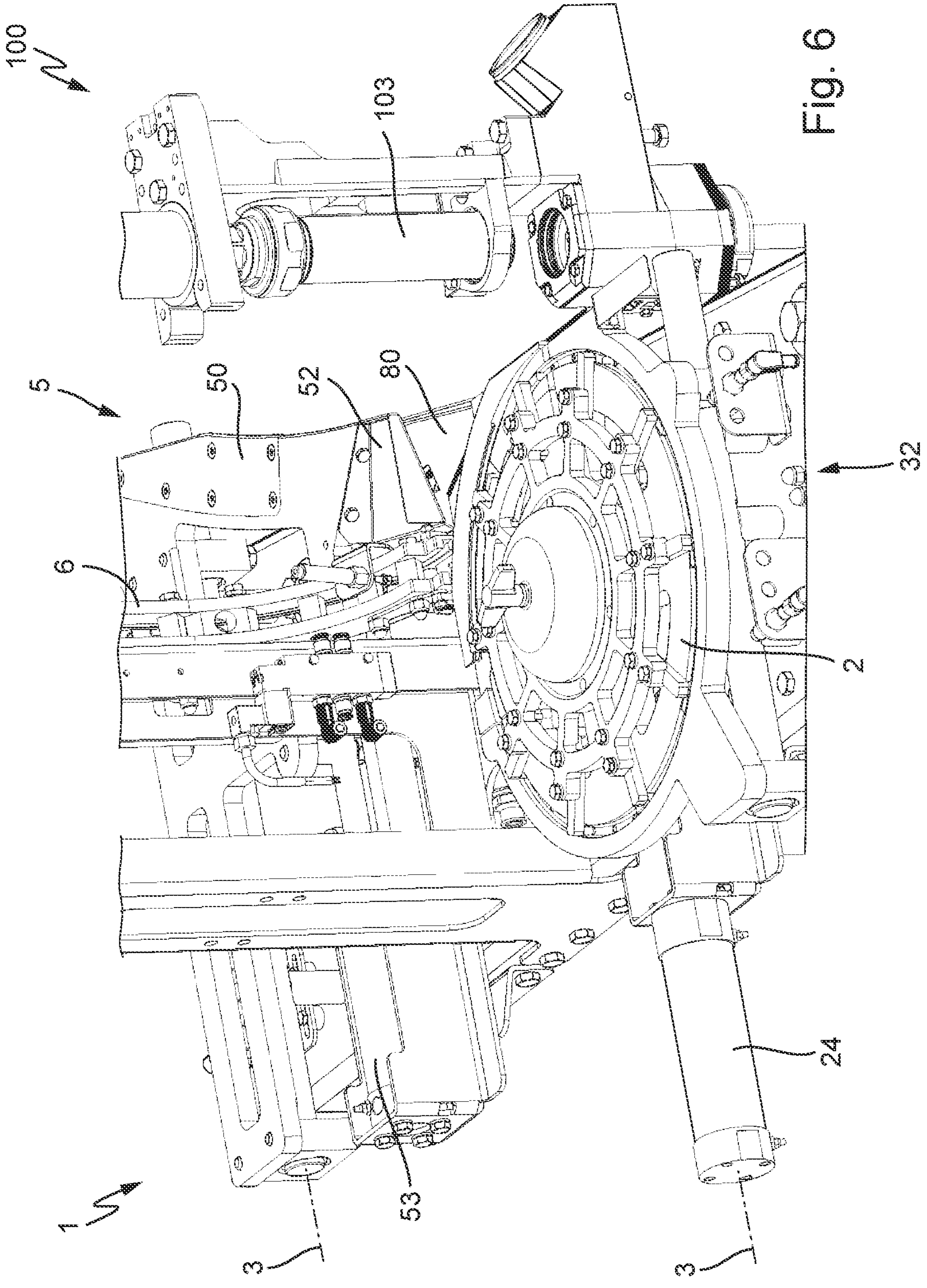
FIG. 6 shows schematically, a further perspective side view of the closing device from FIG. 3.
Figure 7:
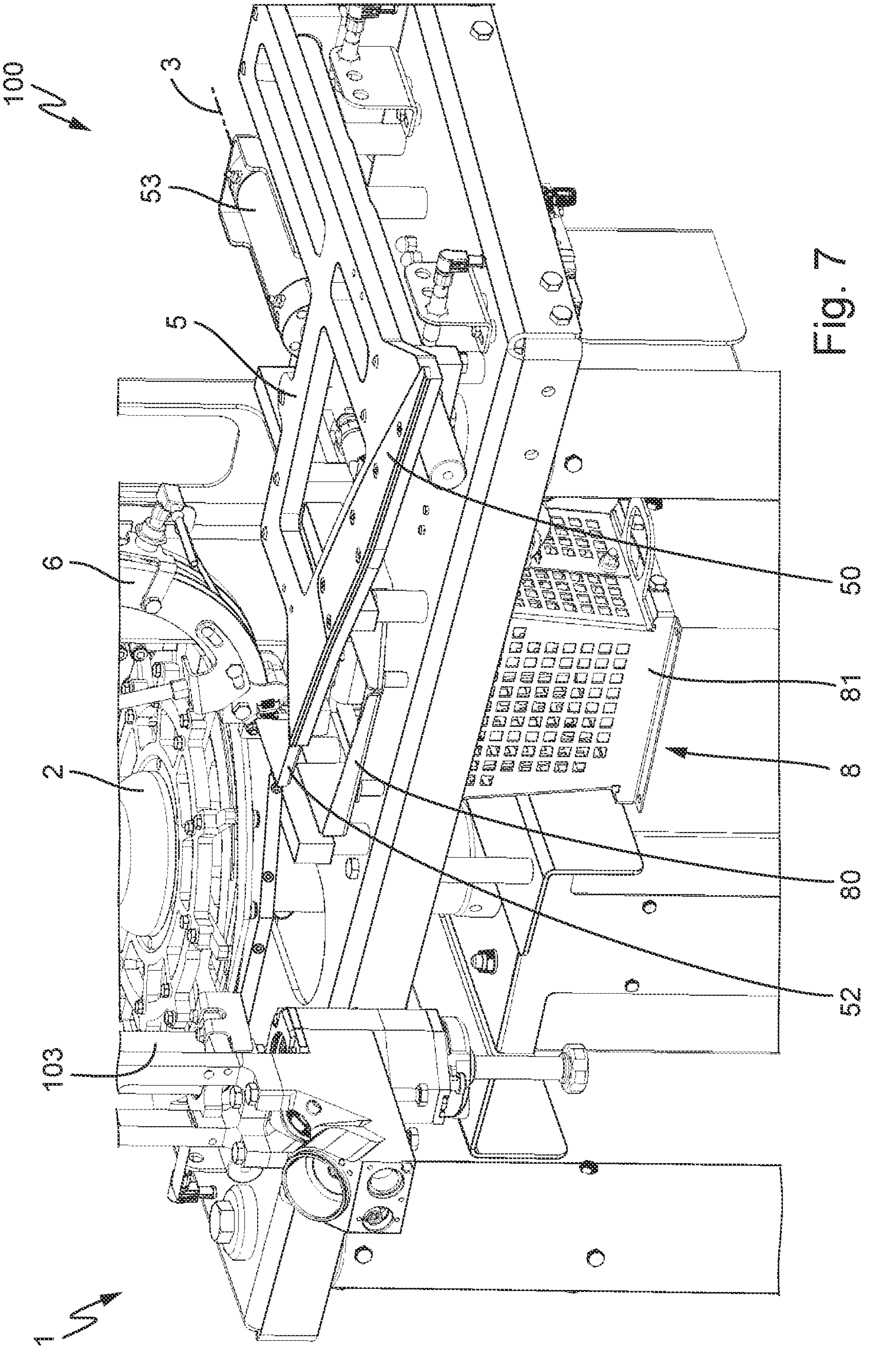
FIG. 7 shows schematically, a further perspective side view of the closing device from FIG. 6.

FIGS. 6 and 7 show schematic, perspective detail views of the closing device 100 with the device 1 according to FIGS. 3 and 4, wherein the carrier wheel 2 and the scraping unit 5 have been moved in the displacement direction 3, out of the operating position 31 shown in FIGS. 3 and 4, into the retracted position 32.

By retraction of the carrier wheel 2, container closures present in the closure supply 6 can be discharged into the closure collecting unit 8.

Figure 8:
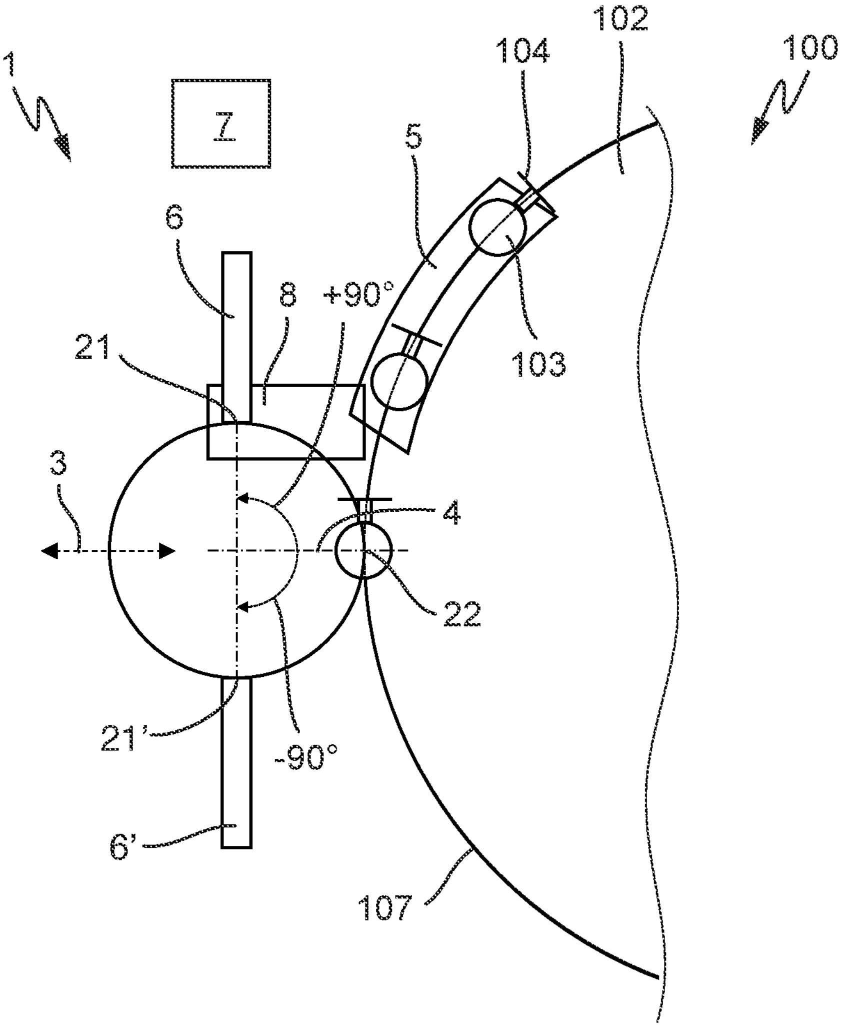
FIG. 8 shows schematically, a top view of a closing device for container closures with a device for supplying a container closure to the closing device according to a further embodiment.

FIG. 8 shows schematically a top view of a closing device 100 for container closures with a device 1 for supplying a container closure to the closing device 100 according to a further embodiment. The closing device 100 substantially corresponds to that of FIG. 1, wherein the device 1 comprises a plurality of closure supplies 6, 6', in the present case two closure supplies 6, 6'. Each of the closure supplies 6, 6' is configured to supply a specific type from various types of container closures 9. The closure supplies 6, 6' are arranged on opposite sides of the carrier wheel 2 with respect to an axis extending through the transfer position 22 in the direction of the displacement direction 3 of the carrier wheel 2. In the present case, the closure supplies 6, 6' are each oriented perpendicularly to the displacement direction 3. Alternatively, however, they may also each be arranged in a region of ±90° to the displacement direction 3 at the sides of the transfer position 22, as indicated in FIG. 8.

Where applicable, all individual features illustrated in the exemplary embodiments may be combined with one another and/or exchanged without leaving the scope of the invention.

What is claimed is:

1. A device for supplying a container closure to a closing device configured to close a container with the container closure comprising:

a rotatable carrier wheel configured to transport the container closure from a supply position, at which the container closure is supplied by a closure supply, to a transfer position, at which the transported container closure is received by the closing device, wherein the rotatable carrier wheel is further configured to be displaceable between an operating position corresponding to the transfer position and a retracted position at which the rotatable carrier wheel is spaced from the transfer position; and a scraping unit configured to remove the container closure held by the closing device, wherein the scraping unit is mounted upstream of the rotatable carrier wheel with respect to a movement direction of the closing device.

2. The device of claim 1, wherein:

the rotatable carrier wheel is rotatable about a rotational axis, a displacement direction of the rotatable carrier wheel between the operating position and the retracted position is oriented substantially horizontally, the displacement direction is oriented perpendicularly to the rotational axis, and/or the displacement direction, viewed in a plane perpendicular to the rotational axis, is oriented in a region of ±90° to a straight line that extends through the transfer position in a radial direction relative to the rotational axis.

3. The device of claim 2, wherein the displacement direction is oriented in a direction of the straight line that extends through the transfer position in the radial direction relative to the rotational axis.

4. The device of claim 1, further comprising a drive configured to displace the rotatable carrier wheel from the operating position to the retracted position.

5. The device of claim 4, wherein the drive is further configured to displace the rotatable carrier wheel via a locked and preloaded spring pack and/or a locked and pressured pneumatic cylinder that is unlocked by a controller/regulator on occurrence of a collision warning.

6. The device of claim 1, wherein the scraping unit comprises a scraper plate and a removal element configured to remove the container closure held by the closing device.

7. The device of claim 6, wherein the removal element comprises a protrusion or a magnet element.

8. The device of claim 6, wherein the scraper plate is at least partially oriented to provide a scraping via a scraping sheet of the closing device, wherein the scraping sheet is configured to be movable in the movement direction.

9. The device of claim 8, wherein the scraping unit is configured to be displaceable between the operating position, in which the scraping via the scraping sheet of the closing device is possible, and a retracted position.

10. The device of claim 1, wherein a displacement direction of the scraping unit is formed parallel to a displacement direction of the rotatable carrier wheel, and the rotatable carrier wheel and the scraping unit are configured to be jointly displaceable via a common drive and/or a common base frame.

11. The device of claim 1, wherein a displacement direction of the scraping unit is formed parallel to a displacement direction of the rotatable carrier wheel, the rotatable carrier wheel and the scraping unit are configured to be independently displaceable, and the rotatable carrier wheel and the scraping unit each has its own assigned drive.

12. The device of claim 1, wherein the scraping unit comprises a drive configured to displace the scraping unit from the operating position to the retracted position.

13. The device of claim 12, wherein the drive is further configured to displace the scraping unit via a locked and preloaded spring pack and/or a locked and pressured pneumatic cylinder that is unlocked by a controller/regulator on occurrence of a collision warning.

14. The device of claim 1, further comprising a controller/regulator configured to control or regulate a position of the rotatable carrier wheel, the scraping unit, and/or a closure supply, wherein the controller/regulator is further configured, on occurrence of a collision warning, to move the rotatable carrier wheel and/or the scraping unit into its respective retracted position, and move the closure supply out of a collision space.

15. The device of claim 1, further comprising a closure collecting unit arranged at least partially below the scraping unit and/or below the rotatable carrier wheel, wherein the closure collecting unit is configured to collect container closures scraped off by the scraping unit, discharged from the rotatable carrier wheel, or discharged from the closure supply.

16. The device of claim 1, further comprising the closure supply, wherein the closure supply is configured to provide a successive radial supply of container closures to the rotatable carrier wheel, and wherein:

the closure supply is arranged at sides of the transfer position, viewed in a plane perpendicular to a rotational axis of the rotatable carrier wheel, in a region of ±90° to a displacement direction of the rotatable carrier wheel, and/or the closure supply is further configured to be movable between the supply position and an offset position, wherein by movement of the closure supply into the offset position, the closure supply can be brought outside a collision space of the rotatable carrier wheel.

17. The device of claim 16, wherein:

the closure supply comprises a plurality of closure supplies, each closure supply is configured to supply one type of container closure, and one closure supply is arranged on each opposite side of the rotatable carrier wheel with respect to an axis extending through the transfer position in a displacement direction of the rotatable carrier wheel.

18. A closing device for container closures comprising:

a container receiver that is moveable in a movement direction and configured to receive a container to be closed;

a closing unit movable relative to the container receiver, and configured to close a container held in the container receiver with a container closure; and a device configured to supply the container closure to the closing unit and comprising:

a rotatable carrier wheel configured to transport the container closure from a supply position, at which the container closure is supplied by a closure supply, to a transfer position, at which the transported container closure is received by the closing unit, wherein the rotatable carrier wheel is configured to be displaceable between an operating position corresponding to the transfer position and a retracted position at which the rotatable carrier wheel is spaced from the transfer position; and a scraping unit configured to remove the container closure held by the closing device, wherein the scraping unit is mounted upstream of the rotatable carrier wheel with respect to a movement direction of the closing device.

19. The closing device of claim 18, wherein:

the closing device is configured as a rotatable carousel comprising the container receiver and the closing unit on its outer circumference, and the rotatable carrier wheel and the rotatable carousel are arranged such that a transport pitch circle of the rotatable carrier wheel, on which the container closure is transported by the rotatable carrier wheel, and a conveying pitch circle of the rotatable carousel, on which the closing unit is moved by rotation of the rotatable carousel, are arranged tangentially to one another and/or meet in the transfer position.

20. The closing device of claim 18, wherein the scraping unit comprises a scraper plate and a removal element configured to remove the container closure held by the closing device.

* * * * *